US012682691B2

(12) United States Patent
Fredriksson et al.

(10) Patent No.: US 12,682,691 B2
(45) Date of Patent: Jul. 14, 2026

(54) EXPEDITED UPDATE OF CACHED DATA FOR DEVICES IN STANDBY

(71) Applicant: Volvo Car Corporation, Gothenburg (SE)

(72) Inventors: Henning Christian Fredriksson, Götaland (SE); Per Johan Magnus Gunnarsson, Lund (SE)

(73) Assignee: Volvo Car Corporation, Gothenburg (SE)

( * ) Notice: Subject to any disclaimer, the term of this patent is extended or adjusted under 35 U.S.C. 154(b) by 151 days.

(21) Appl. No.: 18/506,282

(22) Filed: Nov. 10, 2023

(65) Prior Publication Data

US 2025/0157264 A1      May 15, 2025

(51) Int. Cl.
*G07C 5/00* (2006.01)
*B60W 60/00* (2020.01)

(52) U.S. Cl.
CPC ........... *G07C 5/008* (2013.01); *B60W 60/001* (2020.02)

(58) Field of Classification Search
None
See application file for complete search history.

(56) References Cited

U.S. PATENT DOCUMENTS

| | | | |
|---|---|---|---|
| 9,139,091 B1 | 9/2015 | Penilla et al. | |
| 10,621,796 B2 * | 4/2020 | Gintz ................... | G07C 5/0841 |
| 11,544,412 B2 | 1/2023 | Golov | |
| 2005/0258806 A1 * | 11/2005 | Janik ....................... | G06F 16/68 |
| | | | 320/155 |
| 2016/0357248 A1 * | 12/2016 | Lingutla ............... | G06F 1/3296 |
| 2018/0255156 A1 * | 9/2018 | Luna ....................... | H04L 67/62 |
| 2020/0288395 A1 * | 9/2020 | Doherty ............. | H04W 52/028 |
| 2021/0398551 A1 * | 12/2021 | Nandy ................... | G10L 15/16 |

FOREIGN PATENT DOCUMENTS

| | | |
|---|---|---|
| CN | 111385191 A | 7/2020 |
| CN | 115665700 A | 1/2023 |
| WO | 2023/001899 A1 | 1/2023 |

* cited by examiner

*Primary Examiner* — Ramon A. Mercado
*Assistant Examiner* — David Ruben Pedersen
(74) *Attorney, Agent, or Firm* — Amin, Turocy & Watson, LLP

(57) ABSTRACT

Various systems and methods are presented regarding synchronizing data transmission between various remote clients and respective local devices. By synchronizing data transmission from the remote clients with data receipt at respective local devices, operation of the local devices can be constrained to specific periods of time. A local device can be woken from a low power mode for a short period of time, cache data, and return to low power mode. By limiting the duration of operation for the local device to receive the data, the local device can quickly return to a low power mode upon data receipt. By synchronizing data transmission from the remote clients to the local device, the duration that the local device has to be awake can be reduced. With transmission synchronization, the local device can be placed into low power mode for longer periods compared to extended operation required receive randomly transmitted data.

20 Claims, 9 Drawing Sheets

100A

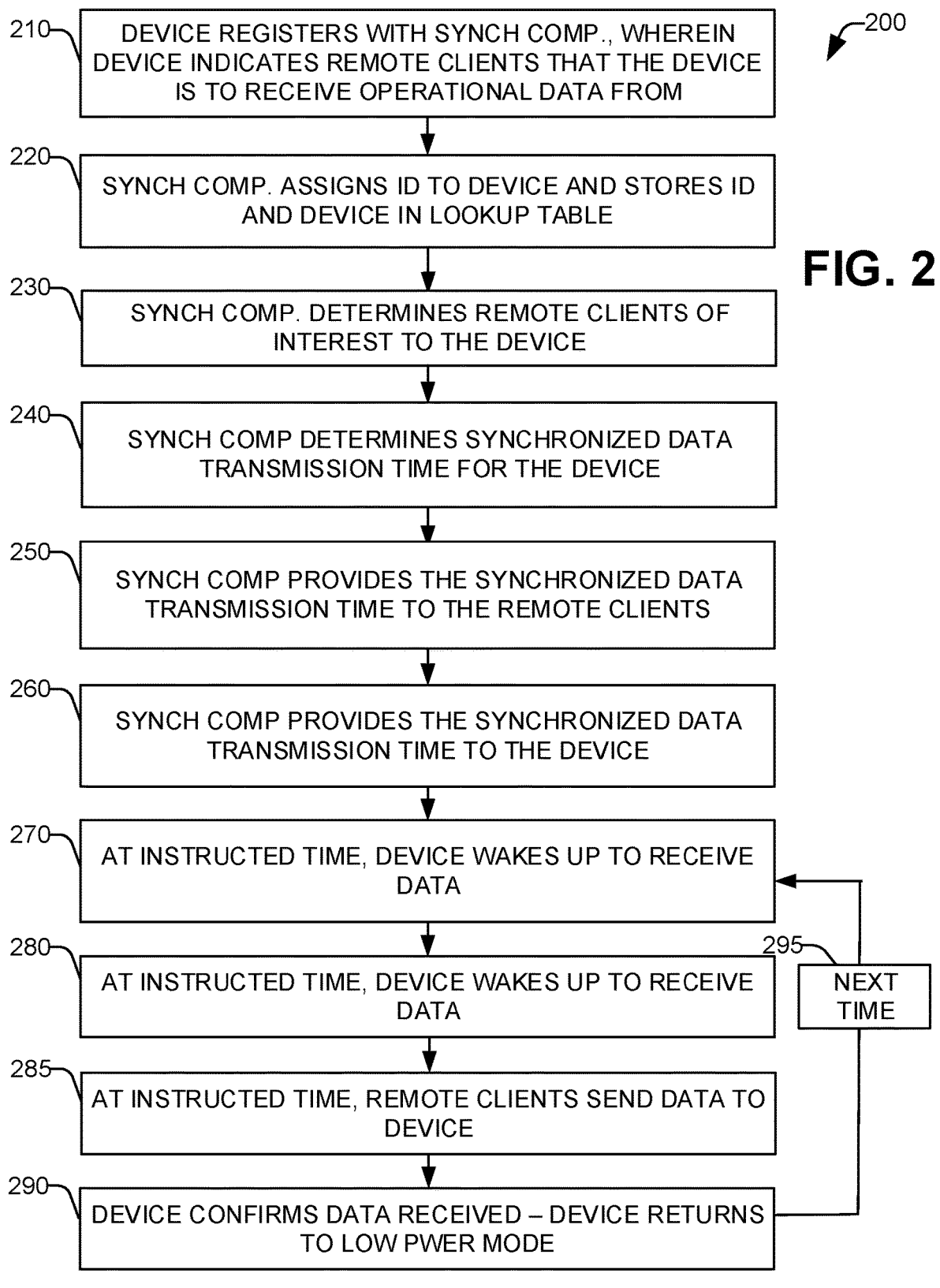

FIG. 2

210 — DEVICE REGISTERS WITH SYNCH COMP., WHEREIN DEVICE INDICATES REMOTE CLIENTS THAT THE DEVICE IS TO RECEIVE OPERATIONAL DATA FROM

220 — SYNCH COMP. ASSIGNS ID TO DEVICE AND STORES ID AND DEVICE IN LOOKUP TABLE

230 — SYNCH COMP. DETERMINES REMOTE CLIENTS OF INTEREST TO THE DEVICE

240 — SYNCH COMP DETERMINES SYNCHRONIZED DATA TRANSMISSION TIME FOR THE DEVICE

250 — SYNCH COMP PROVIDES THE SYNCHRONIZED DATA TRANSMISSION TIME TO THE REMOTE CLIENTS

260 — SYNCH COMP PROVIDES THE SYNCHRONIZED DATA TRANSMISSION TIME TO THE DEVICE

270 — AT INSTRUCTED TIME, DEVICE WAKES UP TO RECEIVE DATA

280 — AT INSTRUCTED TIME, DEVICE WAKES UP TO RECEIVE DATA

285 — AT INSTRUCTED TIME, REMOTE CLIENTS SEND DATA TO DEVICE

290 — DEVICE CONFIRMS DATA RECEIVED – DEVICE RETURNS TO LOW PWER MODE

295 — NEXT TIME

200

400

410 OPERATE WITH A FIRST SCHEDULE

420 MONITOR AVAILABLE BANDWIDTH

430 BW ABOVE THRESH?    YES

NO

440 DETERMINE UPDATED SCHEDULE IN ACCORDANCE WITH BANDWIDTH

450 APPLY UPDATED SCHEDULE TO THE SYSTEM

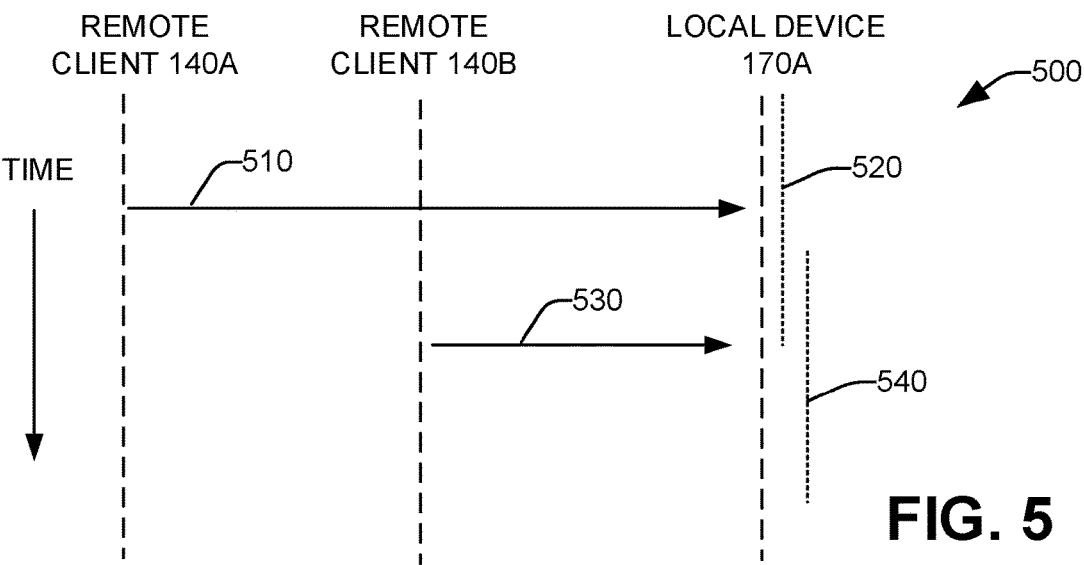
FIG. 5
FIG. 6
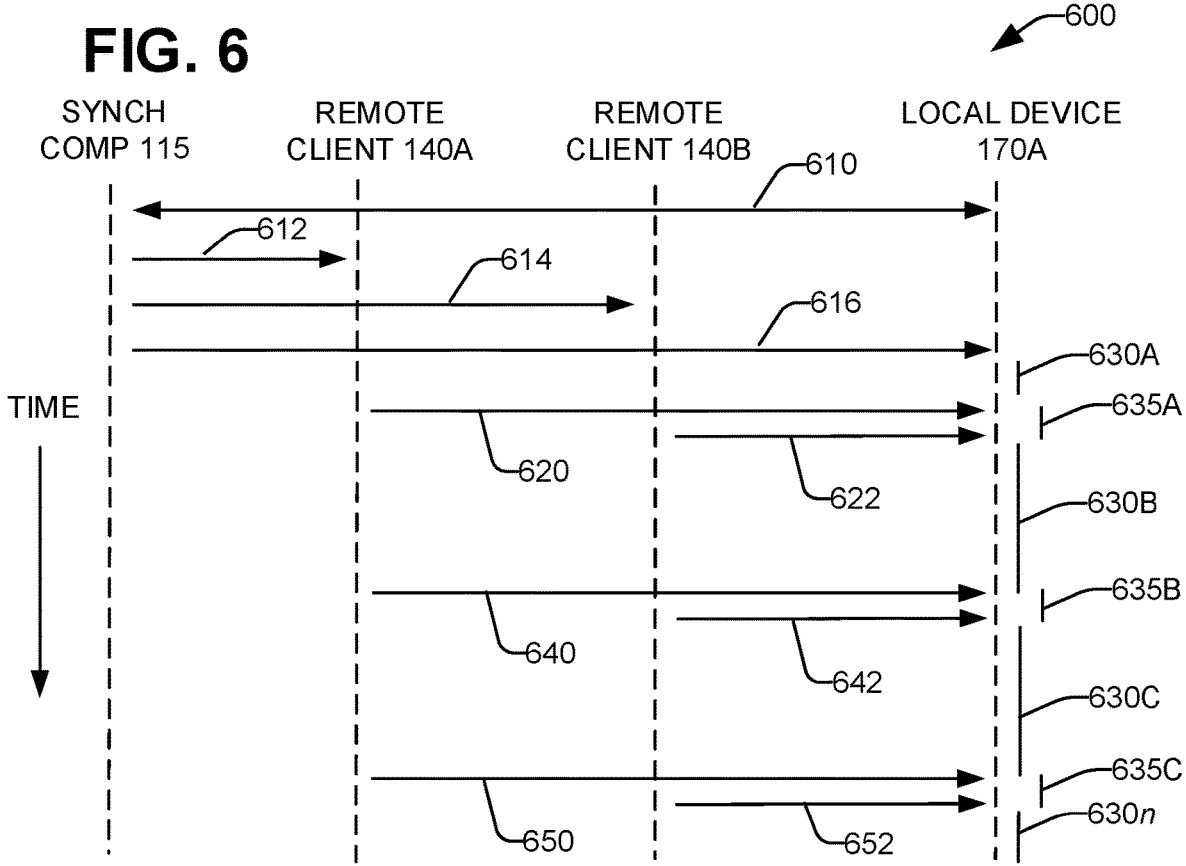

SAE J3016™ LEVELS OF DRIVING AUTOMATION 2018-06

900

| | LEVEL 0 | LEVEL 1 | LEVEL 2 | LEVEL 3 | LEVEL 4 | LEVEL 5 |
|---|---|---|---|---|---|---|
| What does the human in driver's seat have to do? | You *are* driving whenever these driver support features are engaged – even if your feet are off the pedals and you are not steering ||| You are *not* driving whenever these automated driving features are engaged – even if you are seated in "the driver's seat" |||
| | You must constantly supervise these support features; you must steer, brake or accelerate as needed to maintain safety ||| When the feature requests, you must <u>drive</u> | These automated driving features will not require you to take over driving ||
| | These are driver support features ||| These are automated driving features |||
| What do these features do? | These features are limited to providing warnings and momentary assistance | These features provide steering OR brake/ acceleration support to the driver | These features provide steering AND brake/ acceleration support to the driver | These features can drive the vehicle under limited conditions and will not operate unless all required conditions are met || This feature can drive the vehicle under all conditions |
| Example Features | • automatic emergency braking • blind spot warning • lane departure warning | • lane centering OR • adaptive cruise control | • lane centering AND • adaptive cruise control at the same time | • traffic jam chauffeur | • local driverless taxi • pedals/ steering wheel may or may not be installed | • same as level 4, but feature can drive everywhere in all conditions |

FIG. 9 (Prior Art)

EXPEDITED UPDATE OF CACHED DATA FOR DEVICES IN STANDBY

TECHNICAL FIELD

This application relates to data caching from remote devices while reducing battery drain at a local device.

BACKGROUND

While user devices, autonomous vehicles, and suchlike, appear to be operating in isolation/remotely, a variety of operational data is received at the devices, etc., from remote clients, wherein the operational data can be utilized to configure operation of the devices, etc. To conserve battery power, while not in use, a device, etc., can be placed in low-power/sleep mode. However, to receive operational data in a timely manner, the device has to be woken to enable the operational data to be received from the remote clients. In a situation where the device is configured/required to receive operational data from multiple remote clients, and receipt of the operational data is not synchronized across the various remote clients, the device may have to undergo repeated re-wake operations to receive the operational data. However, such repeated, unsynchronized re-wake operations can lead to unnecessary battery drain.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the summary is to present some concepts in a simplified form as a prelude to the more detailed description presented herein.

In one or more embodiments described herein, systems, devices, computer-implemented methods, methods, apparatus and/or computer program products are presented to reduce operational burden on a battery system when caching operational data.

According to one or more embodiments, a system is presented which can comprise a memory that stores computer executable components and a processor that executes the computer executable components stored in the memory. The computer executable components can comprise a synchronization component configured to control transfer of data between at least two remote clients and a first local device, wherein the synchronization component is configured to generate a first data synchronization schedule, the first data synchronization schedule is configured with a defined frequency of wakeup operations undertaken by the first local device to receive data from the at least two remote clients.

In an embodiment, the first data synchronization schedule can comprise a first time at which: a first remote client in the at least two remote clients transfers first data to the first local device; a second remote client in the at least two remote clients transfers second data to the first local device; and the first local device temporarily transitions between a low power mode of operation to a data receive mode of operation to facilitate receipt of the first data and the second data, wherein the duration of temporary low power mode of operation is sufficient to enable receipt of the first data and the second data.

In another embodiment, the synchronization component can be further configured to determine a second data synchronization schedule, wherein the second data synchronization schedule comprises a second time at which: a second local device communicatively coupled to the synchronization component transitions from a low power mode of operation to a data receive mode of operation to facilitate receipt of data; the first remote client transfers third data to the second local device; and the second remote client transfers fourth data to the second local device, wherein the second data synchronization schedule is disparate to the first data synchronization schedule.

In another embodiment, the system can further comprise a look-up table, wherein the synchronization component is further configured to assign a first unique identifier to the first local device and populate the look-up table with the first unique identifier and the first data. In an embodiment, the synchronization component can be further configured to assign a second unique identifier to the second local device, and populate the look-up table with the second unique identifier and the second data synchronization schedule.

In an embodiment, the first local device can be powered by a battery. In another embodiment, the first local device can be one of a cellphone, user equipment, a wearable communication device, an extended reality device, an Internet of Things device, or an automated assistant device. In another embodiment, the first local device can be located onboard a vehicle, wherein the vehicle can be operating at least semi-autonomously. In a further embodiment, the first data or the second data can comprise operational data configured to control at least one operation of the first local device.

In other embodiments, elements described in connection with the disclosed systems can be embodied in different forms such as computer-implemented methods, computer program products, or other forms. For example, in an embodiment, a computer-implemented method can be performed by a device operatively coupled to a processor. In an embodiment, the computer-implemented method can comprise generating, by a device comprising a processor, a first data synchronization schedule, the first data synchronization schedule is configured with a defined frequency of wakeup operations undertaken by a first local device to receive data transmitted from at least two remote clients. In an embodiment, the first data synchronization schedule can comprise a first time at which: a first remote client in the at least two remote clients transfers first data to the first local device; a second remote client in the at least two remote clients transfers second data to the first local device; and the first local device temporarily transitions between a low power mode of operation to a data receive mode of operation to facilitate receipt of the first data and the second data, wherein the duration of temporary low power mode of operation is sufficient to enable receipt of the first data and the second data.

In an embodiment, the computer-implemented method can further comprise determining, by the device, a second data synchronization schedule, wherein the second data synchronization schedule comprises a second time at which: a second local device temporarily transitions between a low power mode of operation to a data receive mode of operation to facilitate receipt of data; the first remote client transfers third data to the second local device; and the second remote client transfers fourth data to the second local device, wherein the second data synchronization schedule is disparate to the first data synchronization schedule.

In another embodiment, the computer-implemented method can further comprise assigning a first unique identifier to the first local device; assigning a second unique identifier to the second local device; and populating a look-up table with: the first unique identifier combined with the first data synchronization schedule; and the second unique identifier combined with the second data synchronization schedule.

Further embodiments can include a computer program product comprising a computer readable storage medium having program instructions embodied therewith. The program instructions are executable by a processor, and can cause the processor to generate a first data synchronization schedule, the first data synchronization schedule is configured to minimize frequency of wakeup operations undertaken by a first local device to receive data transmitted from at least two remote clients. In an embodiment, the first local device can be powered by a battery.

In an embodiment, the first data synchronization schedule can comprise a first time at which: a first remote client in the at least two remote clients transfers first data to the first local device; a second remote client in the at least two remote clients transfers second data to the first local device; and the first local device temporarily transitions between a low power mode of operation to a data receive mode of operation to facilitate receipt of the first data and the second data, wherein the duration of temporary low power mode of operation is sufficient to enable receipt of the first data and the second data.

In another embodiment, the program instructions are further executable by the processor to cause the processor to: determine a second data synchronization schedule, wherein the second data synchronization schedule comprises a second time at which: a second local device temporarily transitions between a low power mode of operation to a data receive mode of operation to facilitate receipt of data; the first remote client transfers third data to the second local device; and the second remote client transfers fourth data to the second local device, wherein the second data synchronization schedule is disparate to the first data synchronization schedule.

In another embodiment, the program instructions are further executable by the processor to cause the processor to: assign a first unique identifier to the first local device; assign a second unique identifier to the second local device; and populate a look-up table with: the first unique identifier combined with the first data synchronization schedule; and the second unique identifier combined with the second data synchronization schedule.

DESCRIPTION OF THE DRAWINGS

One or more embodiments are described below in the Detailed Description section with reference to the following drawings.

FIG. 2 illustrates a flow diagram for a computer-implemented methodology to synchronize transmission of data from a group of remote clients to a device, in accordance with at least one embodiment.

FIG. 5 presents a sequence diagram illustrating a series of operations where data transmission is unsynchronized, in accordance with an embodiment.

FIG. 6 presents a sequence diagram illustrating a series of operations where data transmission is synchronized, in accordance with an embodiment.

FIG. 9 presents a table summarizing SAE J3016, detailing respective functions and features during Levels 0-5 of driving automation (per June 2018).

DETAILED DESCRIPTION

Figure 1A:
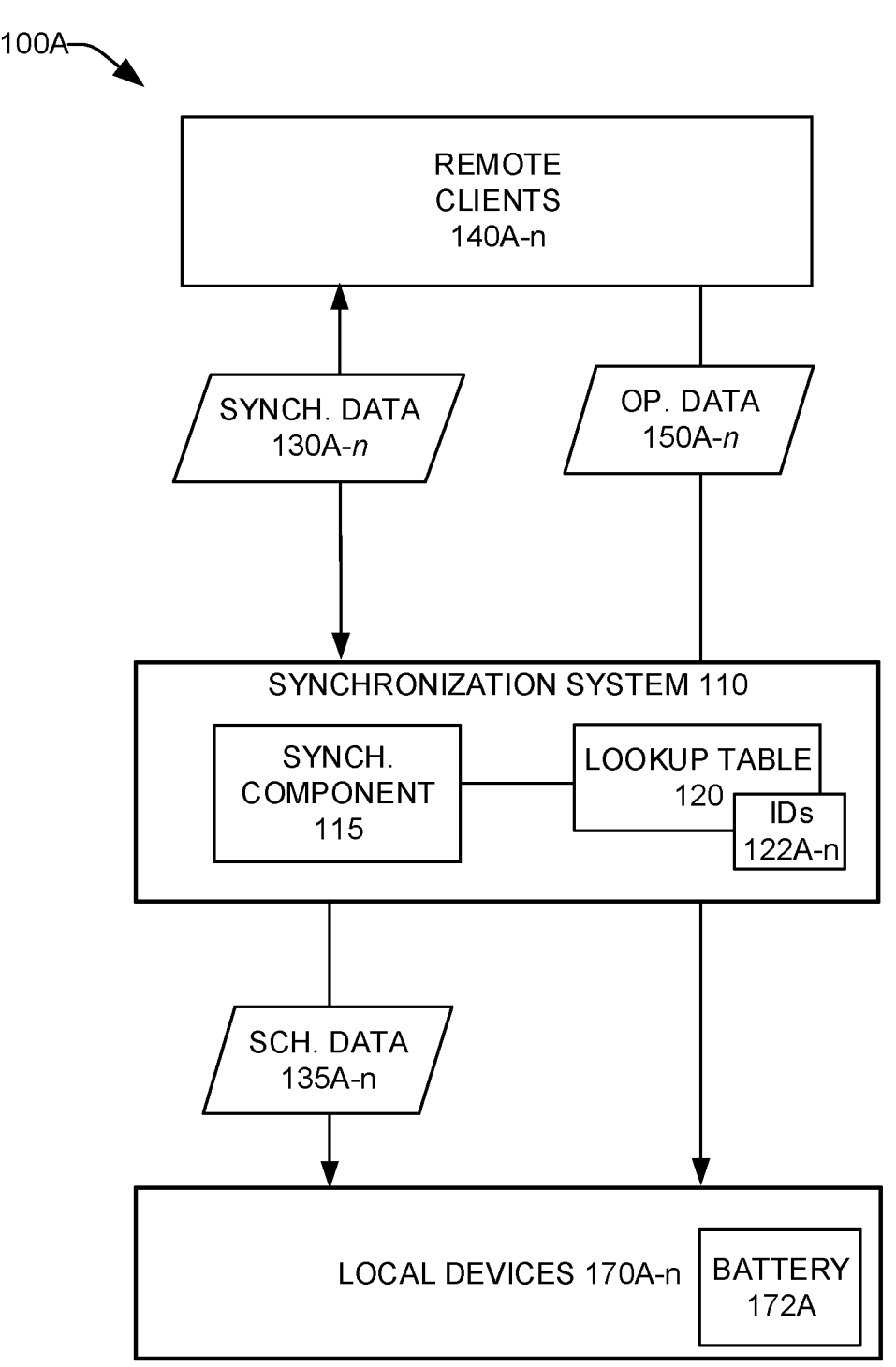
FIG. 1A illustrates a system comprising devices and components configured to cache data while minimizing battery drain arising from device wake-up calls, in accordance with an embodiment.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, n is any positive integer. Accordingly, ranges A-n are utilized herein to indicate a respective plurality of devices, components, signals etc. Further, regarding identification of components presented herein, identifier XXXA-n is used to identify similar components that are distributed across the respective systems, e.g., various local devices 170A-n operating across the system. Furthermore, an identifier XXXA/1 to XXXn/n is used to identify similar components that may be operating on the single device, e.g., local device 170A has a plurality of local components 176A/1 to 176A/n, while local device 170B has a plurality of local components 176B/1 to 176B/n. As used herein, "data" can comprise metadata.

Per the various embodiments presented herein, the disclosed subject matter can be directed to minimize battery drain resulting from data caching while a battery-powered device is awake/operational during a data caching operation, and returns to a low-power mode as soon as possible once the data caching operation is performed.

During regular operation, (e.g., in powered "ON" mode) various systems/devices can be continually receiving operational data (e.g., configuration data) from various remotely located clients (e.g., cloud-based computing systems). However, a situation can frequently arise whereby operational data is available for transmission to a device, even though the device may be in a low-power mode of operation, also known as dormant mode, sleep mode, stand-by status, etc. The device can be in a low-power mode of operation as a result of not being recently used (e.g., no operator interaction has occurred for a pre-defined duration such that the device is in low-power operation to conserve available power from the onboard battery, and suchlike).

With a conventional system, one or more remote clients can provide operational data to a respective onboard system/component. For example, a first component located on a local device can be configured to receive first operational data from a remotely located first remote client, while a second local component located on the local device can be configured to receive second operational data from a remotely located second client, wherein the first client and the second client can be cloud services. When the local device is in operation, the first/second operational data can be configured to receive the first/second operational data at any particular moment as the various components, etc., are in an operational state on the local device. However, while the device is in a low power state, a system wake-up procedure has to be performed, which can lead to battery drain of the battery located on the local device. With a conventional system operating on the local device, the respective remote clients and the counterpart locally-operating components can be configured to generate/transmit (e.g., by the remote client(s)) and receive data (e.g., at the local component(s)) in accordance with a schedule. In an example, the first local component is to wake at least once in a two hour window to potentially receive the first operational data, while a second local component may also be configured to wake at least once in a two hour window to potentially receive the second operational data. However, owing to there being no synchronization between the transmission/receipt of the first operational data and the transmission/receipt of the second operational data, the system onboard the local device wakes-up twice at least every two hours, which over an extended period of time, can unnecessarily consume available battery power. To address the issue, a conventional approach is for the duration of the data caching operation to be extended such that the operational data can be received over an extended period before the respective local components are woken. This approach can reduce the number of wakeup calls that are initiated at the local device, e.g., one single wake up process is initiated but the device is operational for an extended period of time to capture the respective downloads of operational data, but the approach can be further problematic in that an update in operational data may occur but a significant period of time elapses before the change in operational data is visible to the local device.

An example of conventional operation is where two local devices A and B utilize data generated/transmitted from two remote clients C1 and C2. Device A is configured to perform an average of one wakeup from standby per one hour to conserve battery life, and further, device B is configured to perform an average of one wakeup from standby per one hour to conserve battery life.

Hence, based on knowing that devices A and B consume data from two remote clients, a data caching expiration time of 2 hours is returned for data from remote client C1 and remote client C2 to not exceed the limit of average 1 wakeup from standby per 1 hour, a conventional, unsynchronized operation is:

i) At 08:00, device A requests operational data from C1, which is returned with an expiration of 2 hours, e.g., at 10:00.

ii) At 08:05, device B requests operational data from C1, which is returned with an expiration of 2 hours, e.g., at 10:05.

iii) At 08:10, device A requests operational data from C2, which is returned with an expiration of 2 hours, e.g., at 10:10.

iv) At 08:15, device B requests operational data from C2, which is returned with an expiration of 2 hours, e.g., at 10:15.

v) At 10:00, cached value from C1 expires for device A, device A undergoes wakeup to cache/refresh the operational data/value.

vi) At 10:05, cached value from C1 expires for device B, device B undergoes wakeup to cache/refresh the operational data/value.

vii) At 10:10, cached value from C2 expires for device A, device A undergoes wakeup to cache/refresh the operational data/value.

viii) At 10:15, cached value from C2 expires for device B, device B undergoes wakeup to cache/refresh the operational data/value.

ix) At 12:00, cached value from C1 expires for device A, device A undergoes wakeup to cache/refresh the operational data/value.

x) At 12:05, cached value from C1 expires for device B, device B undergoes wakeup to cache/refresh the operational data/value.

xi) At 12:10, cached value from C2 expires for device A, device A undergoes wakeup to cache/refresh the operational data/value.

xii) At 12:15, cached value from C2 expires for device B, device B undergoes wakeup to cache/refresh the operational data/value.

Per the foregoing, it is apparent that owing to the unsynchronized nature of operation, devices A and B undergo a significant number of, and potentially lengthy, wakeup operations to respectively receive the operational data from C1 and C2 in accordance with the caching schedules.

It is to be appreciated that while various embodiments presented herein may be directed towards a scenario of the respective data systems are located on a vehicle communicatively coupled to one or more remotely located systems (e.g., remotely located synchronization component, a remotely located first client, remotely located second client, cloud service, and suchlike), the various embodiments can be equally applied to any device configured to receive data from a remotely located system (e.g., a cloud-based service). For example, the one or more embodiments presented herein can be directed towards such devices as a cellphone, user equipment, a wearable communication device, an extended reality device, an Internet of Things device, an automated assistant device, and the like. In an embodiment, the battery can be a battery pack located onboard a device, and further, the "device" can be a vehicle.

In a non-limiting example, an electric vehicle can have a collection of onboard systems, wherein the respective onboard systems require frequent updates to maintain operational relevancy of the respective systems, whether it be for legal compliance, manufacturer's data systems, etc. In an example scenario, a vehicle may be conducting a journey across a series of countries, state boundaries, etc. In the event of an accident, an accident notification system onboard the vehicle is configured to call a respective national/local telephone number for an emergency service (e.g., police/fire service/ambulance, etc.), wherein the emergency service number can change as a function of the location of the vehicle. In another, example scenario, a vehicle may be being delivered to a location wherein, upon delivery, the vehicle can be configured to obtain the local numbers/operating conditions for the delivery location. In a further example scenario, local regulations may prevent a vehicle being operated in a specific manner. For example, a first country may have a legal requirement that a vehicle cannot be remotely started prior to use, wherein remote starting can be utilized to enable the vehicle's environmental conditioning system (e.g., passenger heating system, air conditioner, and suchlike) to be activated to pre-configure the passenger compartment for the operator's comfort. Furthering the example, a second country may legally enable remote starting prior to the operator boarding the vehicle. Hence, an onboard system requires data indicating whether the vehicle can be remotely-started or not. The vehicle can be operating non-autonomously, semi-autonomously, or autonomously.

While one or more devices and/or systems are described below with reference to an electric vehicle, such as an automobile, the one or more embodiments described herein are not limited to this use. For example, one or more embodiments presented herein can be utilized to monitor/control data caching on any vehicle having an onboard battery, wherein the battery may be located on a military vehicle, railroad vehicle, a marine vehicle such as a boat, ship, submarine, or marine drone, a winged vehicle such as a plane or drone, and/or a rotored vehicle such as a helicopter or drone. Likewise, one or more embodiments presented herein can be extended to monitoring/controlling data caching at a robot and/or any suitable moving or stationary device. Other applicable applications include scooters, Segway®, electric bicycles, E-rickshaws, and the like.

Further, the embodiments can be applied to any vehicle utilizing a battery system, e.g., a Battery Electric Vehicle (BEV) where the powerplant is only an electric motor powered by a battery and the battery is recharged via an external charging station, a Hybrid Electric Vehicle (HEV) having both a gasoline/petrol engine & fuel tank and an electric motor powered by a battery, wherein operation of the HEV recharges the battery (e.g., via a regenerative braking system capturing kinetic energy), a Plug-in Hybrid Electric Vehicle (PHEV) having both a gasoline/petrol engine & fuel tank and an electric motor powered by a battery, wherein the battery can be charged via an external charging station, and the like.

The various embodiments and concepts can be directed to any device utilizing battery power technology, such as battery cells comprising lithium-ion (Li-ion) battery technologies, lithium nickel cobalt Aluminum (NCA), lithium-nickel manganese cobalt (NMC), lithium-manganese spinel (LMO), lithium titanate (LTO), lithium-iron phosphate (LFP), lithium metal polymer (LMP), nickel manganese cobalt (NMC), nickel-metal hydride (Ni-MH), lithium sulphur (Li—S), lead-acid batteries, as well as ultracapacitors, super capacitors, chemical batteries, solid-state batteries, fuel cells, etc.

Regarding the phrase "autonomous" operation, to enable the level of sophistication of operation of a vehicle to be defined across the industry by both suppliers and policymakers, standards are available to define the level of autonomous operation. For example, the International Standard J3016 *Taxonomy and Definitions for Terms Related to Driving Automation Systems for On-Road Motor Vehicles* has been developed by the Society of Automotive Engineers (SAE) and defines six levels of operation of a driving automation system(s) that performs part or all of the dynamic driving task (DDT) on a sustained basis. The six levels of definitions provided in SAE J3016 range from no driving automation (Level 0) to full driving automation (Level 5), in the context of vehicles and their operation on roadways. Levels 0-5 of SAE J3016 are summarized below and further presented in FIG. 9, Table 900.

Level 0 (No Driving Automation): At Level 0, the vehicle is manually controlled with the automated control system (ACS) having no system capability, the driver provides the DDT regarding steering, braking, acceleration, negotiating traffic, and suchlike. One or more systems may be in place to help the driver, such as an emergency braking system (EBS), but given the EBS technically doesn't drive the vehicle, it does not qualify as automation. The majority of vehicles in current operation are Level 0 automation.

Level 1 (Driver Assistance/Driver Assisted Operation): This is the lowest level of automation. The vehicle features a single automated system for driver assistance, such as steering or acceleration (cruise control) but not both simultaneously. An example of a Level 1 system is adaptive cruise control (ACC), where the vehicle can be maintained at a safe distance behind a lead vehicle (e.g., operating in front of the vehicle operating with Level 1 automation) with the driver performing all other aspects of driving and has full responsibility for monitoring the road and taking over if the assistance system fails to act appropriately.

Level 2 (Partial Driving Automation/Partially Autonomous Operation): The vehicle can (e.g., via an advanced driver assistance system (ADAS)) steer, accelerate, and brake in certain circumstances, however, automation falls short of self-driving as tactical maneuvers such as responding to traffic signals or changing lanes can mainly be controlled by the driver, as does scanning for hazards, with the driver having the ability to take control of the vehicle at any time.

Level 3 (Conditional Driving Automation/Conditionally Autonomous Operation): The vehicle can control numerous aspects of operation (e.g., steering, acceleration, and suchlike), e.g., via monitoring the operational environment, but operation of the vehicle has human override. For example, the autonomous system can prompt a driver to intervene when a scenario is encountered that the onboard system cannot navigate (e.g., with an acceptable level of operational safety), accordingly, the driver must be available to take over operation of the vehicle at any time.

Level 4 (High Driving Automation/High Driving Operation): advancing on from Level 3 operation, while under Level 3 operation the driver must be available, with Level 4, the vehicle can operate without human input or oversight but only under select conditions defined by factors such as road type, geographic area, environments limiting top speed (e.g., urban environments), wherein such limited operation is also known as "geofencing". Under Level 4 operation, a human (e.g., driver) still has the option to manually override automated operation of the vehicle.

Level 5 (Full Driving Automation/Full Driving Operation): Level 5 vehicles do not require human attention for operation, with operation available on any road and/or any road condition that a human driver can navigate (or even beyond the navigation/driving capabilities of a human). Further, operation under Level 5 is not constrained by the geofencing limitations of operation under Level 4. In an embodiment, Level 5 vehicles may not even have steering wheels or acceleration/brake pedals. In an example of use, a destination is entered for the vehicle (e.g., by a passenger, by a supply manager where the vehicle is a delivery vehicle, and suchlike), wherein the vehicle self-controls navigation and operation of the vehicle to the destination.

To clarify, operations under levels 0-2 can require human interaction at all stages or some stages of a journey by a vehicle to a destination. Operations under levels 3-5 do not require human interaction to navigate the vehicle (except for under level 3 where the driver is required to take control in response to the vehicle not being able to safely navigate a road condition).

As referenced herein, DDT relates to various functions of operating a vehicle. DDT is concerned with the operational function(s) and tactical function(s) of vehicle operation, but may not be concerned with the strategic function. Operational function is concerned with controlling the vehicle motion, e.g., steering (lateral motion), and braking/acceleration (longitudinal motion). Tactical function (aka, object and event detection and response (OEDR)) relates to the navigational choices made during a journey to achieve the destination regarding detecting and responding to events and/or objects as needed, e.g., overtake vehicle ahead, take the next exit, follow the detour, and suchlike. Strategic function is concerned with the vehicle destination and the best way to get there, e.g., destination and way point planning. Regarding operational function, a Level 1 vehicle under SAE J3016 controls steering or braking/acceleration, while a Level 2 vehicle must control both steering and braking/acceleration. Autonomous operation of vehicles at Levels 3, 4, and 5 under SAE J3016 involves the vehicle having full control of the operational function and the tactical function. Level 2 operation may involve full control of the operational function and tactical function but the driver is available to take control of the tactical function.

Accordingly, the term "autonomous" as used herein regarding operation of a vehicle with or without a human available to assist the vehicle in self-operation during navigation to a destination, can relate to any of Levels 1-5. In an embodiment, for example, the terms "autonomous operation" or "autonomously" can relate to a vehicle operating at least with Level 2 operation, e.g., a minimum level of operation is Level 2: partially autonomous operation, per SAE J3016. Hence, while Level 2, partially autonomous operation, may be a minimum level of operation, higher levels of operation, e.g., Levels 3-5, are encompassed in operation of the vehicle at Level 2 operation. Similarly, a minimum Level 3 operation encompasses Levels 4-5 operation, and minimum Level 4 operation encompasses operation under Level 5 under SAE J3016.

It is to be appreciated that while the various embodiments presented herein are directed towards to one or more vehicles operating in an autonomous manner (e.g., as an autonomous vehicle, AV), the various embodiments presented herein are not so limited and can be implemented with a group of vehicles operating in any of an autonomous manner (e.g., Level 5 of SAE J3016), a partially autonomous manner (e.g., Level 1 of SAE J3016 or higher), or in a non-autonomous manner (e.g., Level 0 of SAE J3016). For example, a first vehicle can be operating in an autonomous manner (e.g., any of Levels 3-5), a partially autonomous manner (e.g., any of levels 1-2), or in a non-autonomous manner (e.g., Level 0), while a second vehicle can also be operating in any of an autonomous manner, a partially autonomous manner, or in a non-autonomous manner.

Turning to the drawings, FIG. 1A, system 100A, presents devices and components configured to cache data while minimizing battery drain arising from device wake-up calls, in accordance with an embodiment. As illustrated, one or more local devices 170A-n can be communicatively coupled to respective external systems such as remote clients 140A-n, whereby the one or more local devices 170A-n can be configured to receive/utilize operational data 150A-n respectively generated/transmitted by the remote clients 140A-n. As further described, a synchronization system 110 can be incorporated between the remote clients 140A-n and the local devices 170A-n, wherein the synchronization system 110 can include a synchronization component (synch comp.) 115. The synch comp. 115 can be configured to schedule/synchronize availability/transmission of operational data 150A-n available (e.g., generated/transmitted) at the one or more remote clients 140A-n for receipt/caching by the one or more local devices 170A-n. As shown, synchronization can be established between the synchronization system 110 and the remote clients 140A-n via synchronization data (synch data) 130A-n and further, synchronization can be further configured between the synchronization system 110 and the local devices 170A-n via the schedule data 135A-n. As further described, the synchronization system 110 can include a lookup table/database 120, whereby the respective synchronizations between the synchronization system 110 and the remote clients 140A-n and the local devices 170A-n can be based on respective identifiers (ID's) assigned to each of the local devices 170A-n.

Figure 1B:
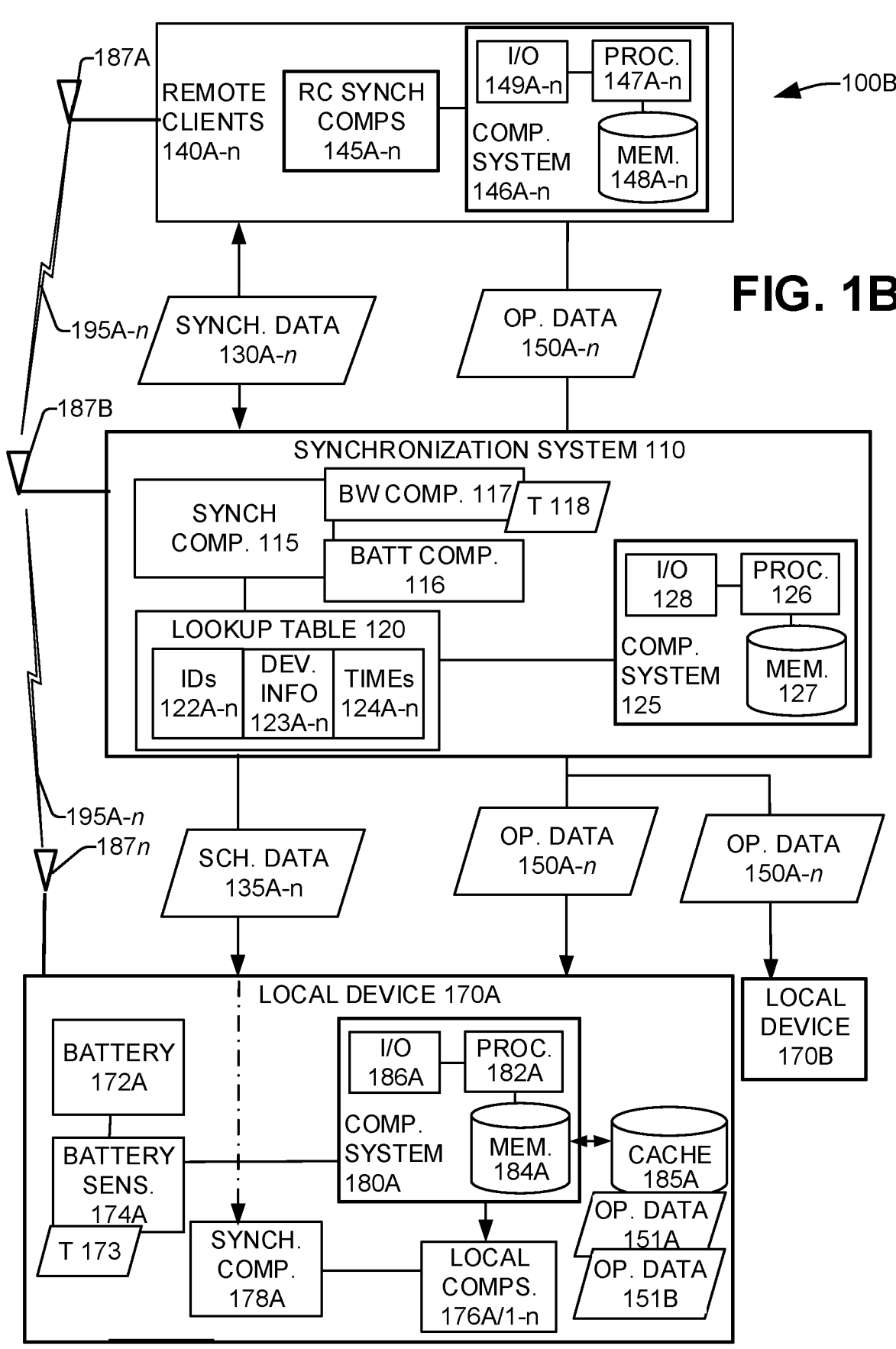
FIG. 1B further illustrates a system comprising devices and components configured to cache data while minimizing battery drain as a result of wakeup operations, in accordance with an embodiment.

FIG. 1B, further presents a system 100B illustrating devices and components configured to cache data while minimizing battery drain as a result of wakeup operations, in accordance with an embodiment. FIG. 1B further expands upon/describes devices and components presented in FIG. 1A. In the example configuration presented in FIG. 1B, a local device 170A (e.g., a first local device) can be communicatively coupled to various remote clients 140A-n, wherein, communication can be via a synchronization system 110 or directly between the remote clients 140A-n and the local devices 170A-n (e.g., for direct transmission of operational data 150A-n).

As mentioned, the synchronization system 110 can include synch comp. 115 communicatively coupled to a lookup table/database 120 comprising respective identifiers 122A-n, wherein in the example embodiment, identifiers 122A-n are respectively assigned to respective local devices 170A-n configured to communicate with the synchronization system 110. As further shown, a second local device, local device 170B can also be communicatively coupled to the synchronization system 110 and various remote clients 140A-n, wherein the local device 170B can have functionality and architecture comparable to that of local device 170A, as described herein. Further, the local device 170A and local device 170B can function concurrently such that scheduling/synchronization of transmission of operational data 150A-n can be performed by the synch comp. 115 in accord with the respective operational requirement(s) of the local device 170A and local device 170B.

In an example scenario, local device 170A has a battery 172A located onboard and further, a battery sensor 174A. Local device 170A can further include respective onboard components 176A/1-*n*, wherein a first local component 176A/1 can be configured to communicate with a first remote client 140A, a second local component 176A/2 can be configured to communicate with a second remote client 140B, an n*th* local component 176A/n can be configured to communicate with an n*th* remote client 140*n*, etc.

As further shown, operational data 150A-n can be shared between the respective remote clients 140A-n and the respective local components 176A-n. Remote client 140A can be configured to generate and transmit first operational data 150A/1 to the first local component 176A/1, remote client 140B can be configured to generate and transmit second operational data 150A/2 to the second local component 176A/2, n*th* remote client 140*n* can be configured to generate and transmit n*th* local operational data 150A/n to the first local component 176A/n.

Herein, any operational data that has been generated by the respective remote clients 140A-n and is awaiting transmission to and/or is currently being transmitted to a respective local device 170A-n is referenced as operational data 150A-n. Further, any operational data that has been received by and/or stored at the respective local device 170A-n is referred to as operational data 151A-n. Hence, per FIG. 1B, local device 170A is configured to receive the operational data 150A-n while having previously stored operational data 151A-n in a cache 185A, wherein cache 185A can be located in an onboard memory 184A (as further described).

In an embodiment, the operational data 150A-n can comprise of any information, data, etc., to be transferred from the respective remote clients 140A-n to the local components 176A-n, wherein the operational data 150A-n can be configuration data, settings, etc. As mentioned, in an example embodiment, the local devices 170A-n can be vehicles, wherein the operational data 150A-n can include accident reporting telephone numbers, legal requirement data, and suchlike, as previously discussed.

Remote clients 140A-n can include a remote client synchronization component 145A-n (also known as RC synch component) wherein the respective RC synch component 145A-n can be configured to communicate with the synchronization component 115 located on the synchronization system 110, wherein the RC synch component 145A-n and synchronization component 115 can share synchronization data 130A-n. Synchronization data 130A-n can include respective timing data that can be utilized to control generation/transmission of the operational data 150A-n from the remote clients 140A-n to the local devices 170A-n, as further described.

As mentioned, in a further embodiment, the local device 170A can further include a battery 172A and a battery sensor 174A, wherein the battery 172A can be configured to power local device 170A and battery sensor 174A can be configured to monitor the operational health (e.g., power, charge, state of health (SoH), etc.) of the battery 172A. Local synchronization components 178A-n can be respectively located on the respective local devices 170A-n, e.g., local device 170A can further include a local synch comp. 178A. In an embodiment, the synch comp. 178A can be utilized to control synchronization of data caching (e.g., the operational data 150A/1-*n*) between the remote clients 140A-n, synchronization system 110, and the local device 170A.

As further shown in FIG. 1B, the respective systems and devices can include respective locally operating computer systems, e.g., synchronization system 110 includes a computer system 125, respective remote clients 140A-n can include a respective computer system(s) 146A-n, and local devices 170A-n can include respective computer systems 180A-n, e.g., local device 170A includes a computer system 180A. Further, each computer system 125, 146A-n, 180A-n can include a processor 126/147A-n/183A-n, a memory 127/148A-n/184A-n, and an input/output I/O component 128/149A-n/186A-n, wherein the respective processor can execute the various computer-executable components, functions, operations, etc., presented herein. The memory 127, 148A-n, 184A-n can be utilized to store the various computer-executable components, functions, code, etc., as well as battery measurements by battery sensor 174A-n, IDs 122A-n, device info 123A-n, data cache timings 124A-n, schedule data 135A-n, synchronization date 130A-n, operational data 151A-n, battery charge threshold 173, bandwidth threshold 118, and suchlike.

The respective I/O components 186A-n, 128, 149A-n (and accordingly remote clients 140A-n, synchronization system 110, local devices 170A-n) can be communicatively coupled, via respective antennas 187A-n, with transmission of data, e.g., synch data 130A-n, schedule data 135A-n, operational data 150A-n, being via signals 195A-n. Any suitable technology can be utilized to enable the various embodiments presented herein, regarding transmission and receiving of signals 195A-n. Suitable technologies include BLUETOOTH®, cellular technology (e.g., 3G, 4G, 5G), internet technology, ethernet technology, ultra-wideband (UWB), DECAWAVE®, IEEE 802.15.4a standard-based technology, Wi-Fi technology, Radio Frequency Identification (RFID), Near Field Communication (NFC) radio technology, and the like.

As previously mentioned, with a conventional system/methodology, transmission of operational data (e.g., operational data 150A-n) between remote clients 140A-n and the local components 176A-n can be unsynchronized. For example, first remote client 140A transmits operational data 150A/1 to first local component 176A/1 at time XX:XX while second remote client 140B transmits operational data 150A/1 to second local component 176A/2 at time YY:YY. Hence, the I/O component 186A has to wake at time XX:XX to be available to download operational data 150A/1, once the operational data 150A/1 has been downloaded, the I/O component 186A can return to a dormant mode. At time YY:YY the I/O component 186A has to wake once again to be available to download operational data 150A-2 for second local component 176A/2, and once the operational data 150A/2 has been downloaded, the I/O component 186A can return to a dormant mode. Accordingly, owing to the unsynchronized downloading of the operational data 150A/1-*n* and the accompanying waking/sleeping of the I/O component 186A, the battery 172A can be unnecessarily drained, which can be an operational concern regarding operational time of the local device 170A (e.g., where local device 170A is cellphone, for example), operational range of a first vehicle on which the local device 170A is operating, etc., as well as being inefficient power usage.

Per the various embodiments presented herein, efficiency of battery usage can be improved/increased compared to battery usage of a conventional system. By synchronizing downloading of operational data 150A/1-*n*, the number of wake/sleep operations that are undertaken at the I/O component 186A, etc., power drain of battery 172A can be reduced for an equivalent volume of operational data 150A-n over an extended period of time, in comparison with downloading the same volume of operational data 150A-n by a conventional system.

In an embodiment, the respective local devices 170A-n can be given a unique identifier, IDs 122A-n, wherein the IDs 122A-n in conjunction with information regarding local devices 170A-n, e.g., local device information 123A-n, and synchronization/cache timings 124A-n, can be stored in the lookup table 120 at the synchronization system 110 (e.g., lookup table 120 can be stored in the memory 127). By assigning a respective ID 122A-n to each of the local devices 170A-n, the synch comp 115 can a) synchronize transmission of operational data 150A-n generated by the remote clients 140A-n, and accordingly, b) the respective I/O component 186A-n and synch comps 178A-n at the respective local devices 170A-n can be woken once per a data caching period to receive and cache the respective operational data 150A-n (e.g., to become operational data 151A-n as previously described) as a function of the assigned ID 122A-n.

Synchronized cache expiration times 124A-n can be returned for operational data 150A-n from remote client 140A and remote client 140B. Hence, in comparison with the previously described conventional approach, the following procedures can be implemented in accordance with the various embodiments presented herein:

i) At 08:00, local device 170A requests operational data 150A from remote client 140A, which is returned with a cache expiration time 124A of 09:00. As mentioned, the synch comp 115 can configure (e.g., via the synch data 130A-n) the respective remote clients 140A-n with a cache expiration time 124A-n (e.g., a first data synchronization time, a second data synchronization time, and suchlike) for each of the local devices 170A-n, hence, operational data 150A-n to be transmitted to local device 170A is assigned a cache expiration time 124A (e.g., a first data synchronization time) having a schedule of XX:00, wherein, XX indicates the hour and 00 indicates 00 minutes past the hour. Accordingly, as further presented, in the example sequence, all remote clients 140A-n configured to transmit operational data 150A-n to local device 170A have a cache expiration time 124A set to XX:00 for data transmission to local device 170A, as determined/configured by synch comp 115.

ii) At 08:05, local device 170B requests operational data 150B from remote client 140A, which is returned with a cache expiration time 124B (e.g., a second data synchronization time) of 09:05, hence, operational data 150A-n to be transmitted to local device 170B is assigned a cache expiration time 124B having a schedule of XX:05, wherein, XX indicates the hour and 05 indicates the minutes past the hour XX. Accordingly, as further presented, in the example sequence, all remote clients 140A-n configured to transmit operational data 150A-n to local device 170B have a cache expiration time 124A set to XX:00, as determined/configured by synch comp 115. The respective requests for operational data 150A-n from the local devices 140A-n can be received and utilized by the synch comp 115 to identify which remote devices 140A-n are to communicate with the local devices 140A-n. In an embodiment, synchronization component 115 can configure the respective cache expiration times 124A, 124B, 124n to be disparate so as to prevent any overlap of transmission of operational data 150A-n between the remote clients 140A-n and the local devices 170A-n.

iii) At 08:10, local device 170A requests operational data 150C from remote client 140B, which is returned with a cache expiration time 124A of 09:00.

iv) At 08:15, local device 170B requests operational data 150D from remote client 140B, which is returned with a cache expiration time 124B of 09:05.

v) At 09:00, cached operational data 151A/1 from remote clients 140A and 140B (e.g., operational data 151A and 151B previously stored in cache 185A) expire for local device 170A, hence, local device 170A resumes from wakeup (e.g., in accordance with cache expiration time 124A) to refresh both cached values, e.g., newly received an operational data 151A and 151B.

vi) At 09:05, cached operational data 151B/1 from remote clients 140A and 140B expires for local device 170B, local device 170B resumes from wakeup to refresh cached operational data 151B with operational data 150B.

vii) At 10:00, cached operational data 151A from remote clients 140A and 140B expires for local device 170A, hence, local device 170A resumes from wakeup to refresh cached operational data 151A with new operational data 150A.

viii) At 10:05, cached operational data 151B from remote clients 140A and 140B expires for local device 170B, local device 170B resumes from wakeup to refresh cached operational data 151B with new operational data 150B.

ix) At 11:00, cached operational data 151A from remote clients 140A and 140B expires for local device 170A, hence, local device 170A resumes from wakeup to refresh cached operational data 151A with new operational data 150A.

x) At 11:05, cached operational data 151B from remote clients 140A and 140B expires for local device 170B, local device 170B resumes from wakeup to refresh cached operational data 151B with new operational data 150B.

xi) At 12:00, cached operational data 151A from remote clients 140A and 140B expires for local device 170A, hence, local device 170A resumes from wakeup to refresh cached operational data 151A with new operational data 150A.

xii) At 12:05, cached operational data 151B from remote clients 140A and 140B expires for local device 170B, local device 170B resumes from wakeup to refresh cached operational data 151B with new operational data 150B.

For both the conventional approach and the various approaches presented herein in accord with the various embodiments presented herein, during the two hour period of 10:00 to 11:59, local devices 170A and 170B will resume from wakeup 2 times each to refresh cached values.

However, for the conventional approach only, if operational data from remote client 140A is updated at 10:10, it will not be visible to local device 170A until 12:00 and not visible to local device 170B until 12:05. Hence, the delay in data visibility will further increase if operational data needs to be requested from additional remote clients 140B-n. Per the various embodiments presented herein, if operational data 150A from remote client 140A is updated at 10:10, it will be visible to local device 170A at 11:00 and further visible to local device 170B at 11:05. Per the embodiments presented herein, given the synchronization of transmission of operational data 150A-n from remote clients 140A-n to each respective local device 170A-n, the delay/time schedule is constant regardless of whether further operational data 150B-n is requested (and received) from other remote clients 140C-n.

In another aspect, the synchronizing of data transmission and caching can be conducted while paying attention to an operational parameter, such as (a) the health of the battery 172A-n, (b) available bandwidth between the remote clients 140A-n to transmit the operational data 150A-n to the local devices 170A-n.

In an embodiment, a battery sensor 174A can be configured to monitor the health of the battery 172A (e.g., remaining charge, state of health, and suchlike). As mentioned, for operational data 150A-n to be cached at a local device 170A-n, the local device 170A temporarily transitions from low power operation to operational mode. A threshold 173 can be applied to the battery sensor 174A such that when the charge of the battery 172A is below the threshold 173, the synch comp. 115 can be configured to extend duration between respective data caching operations. E.g., a first data caching schedule is defined by the synch. comp. 115 to be performed every hour, but in response to the battery 172A having charge available that is less than the threshold 173, the synch comp. 115 can generate a second data caching schedule where the data caching is to be performed every two hours, which can place less operational strain/loading on the battery 172A. A battery component 116 located at the synch comp 115 can be configured to monitor the respective operational health of the batteries 172A-n, via the battery sensors 174A-n, and based upon the detected less than threshold operation, the synch comp 115 can adjust the data caching schedule accordingly.

In another embodiment, the synch comp 115 can also include a bandwidth component 117 configured to monitor transmission of operational data 150A-n between the remote clients 140A-n and the local devices 170A (e.g., via signals 195A-n). In an embodiment, in the event of the available bandwidth is less than a threshold value 118, the synch component 115 can extend the timing at which a data caching operation is to be performed to accommodate the variation in bandwidth, e.g., transmit data at a later time, etc. With bandwidth returning to normal, the synch comp 115 can subsequently reduce the delay between data caching operations.

FIG. 2 illustrates a flow diagram 200 for a computer-implemented methodology to synchronize transmission of data from a group of remote clients to a device, in accordance with at least one embodiment.

At 210, a device (e.g., local device 170A, a first local device) can register with a synch comp. (e.g., synch comp. 115 located in synch system 110. Duering the registration operation, the device can identify the respective remote clients (e.g., remote clients 140A-n) that the device is configured to receive operational data (e.g., operational data 150A-n), wherein the operational data can be utilized by various local components (e.g., local components 176A-n operating on the local device 170A).

At 220, the synch comp. can be configured to assign a unique identifier (e.g., any of unique IDs 122) to the device. The synch comp. can be further configured to store the unique ID for the device in a lookup table (e.g., lookup table 120), information regarding the device, and further information regarding how communications are to be conducted with the device, e.g., via an I/O component (e.g., the I/O component 186A located on local device 170A).

At 230, the synch comp. can be further configured to determine/identify the remote clients (e.g., a subset of remote clients 140A-n that have been identified (e.g., at step 210) as being required to transmit operational data to the local device) that the device has indicated the device is requiring operational data from.

At 240, the synch comp. can be further configured to determine a synch time (e.g., a synchronized data transmission time) for which operational data is to be transmitted from the respective remote clients (e.g., the subset of remote clients 140A-n). As previously described, the determined synch time is a synchronized time at which (a) a data cache 185A or other local components 176A/1-n located on the local device should temporarily be in a woke state/operational state to enable receipt of the operational data, and (b) the respective remote clients (e.g., the subset of remote clients 140A-n that have been identified as being required to transmit operational data 150A/1-n to the local device 170A). In an embodiment, the synch comp. can be configured to review pre-existing/co-existing unique identifiers and synch times that have been previously established (e.g., by the synch comp.) for transmission of operational data to other local devices (e.g., local devices 170B-n). Accordingly, the synch comp. can be configured to identify a time window which is free for transmission of operational data from the respective remote clients to the device, wherein the time window is a time at which none of the respective remote clients are not transmitting operational data to another device.

At 250, the synch comp. can be further configured to transmit the synch time to the identified remote clients (e.g., in synch data 130A-n).

At 260, the synch comp. can be further configured to transmit the synch time to the local device (e.g., in schedule data 135A-n).

At 270, at the synch time, the local device can be configured to wake up to receive the operational data. In an embodiment, the wake up process can entail waking up the local cache (e.g., local cache 185A in memory 184A) located on the device, such that the operational data received from the remote clients is saved/stored in the local cache for further implementation by the various local components (e.g., local components 176A/1-n), hence negating having to wake up any of the local components to receive the operational data. By caching the operational data, the local components can by supplied with/retrieve the operational data from the cache when the device is placed in an operational mode, e.g., all local components are woken and operational. The device, including the cache, can return to low power/sleep mode when the operational data has been received. In another embodiment, at the synch time, the respective components can be temporarily woken to receive the operational data and then temporarily returned to low-power/sleep mode when the operational data has been received.

At 280, at the instructed data caching time, the local device can transition from low power mode to operational mode in preparation to receive the operational data from the remote clients.

At 285, also in accordance with the synch time, the respective clients can send the operational data to the device, e.g., to the local cache and/or the local component(s).

At 290, a respective handshake/data confirmation operation can be undertaken by the device, wherein the device can be configured to confirm receipt of the anticipated operational data (e.g., all operational data has been received). Once the handshake operation has been undertaken, the device can return to low-power/sleep mode.

At 295, methodology 200 can return to 270, for the next synch time operation to occur regarding the next download of operational data at the device from the remote clients.

Figure 3:
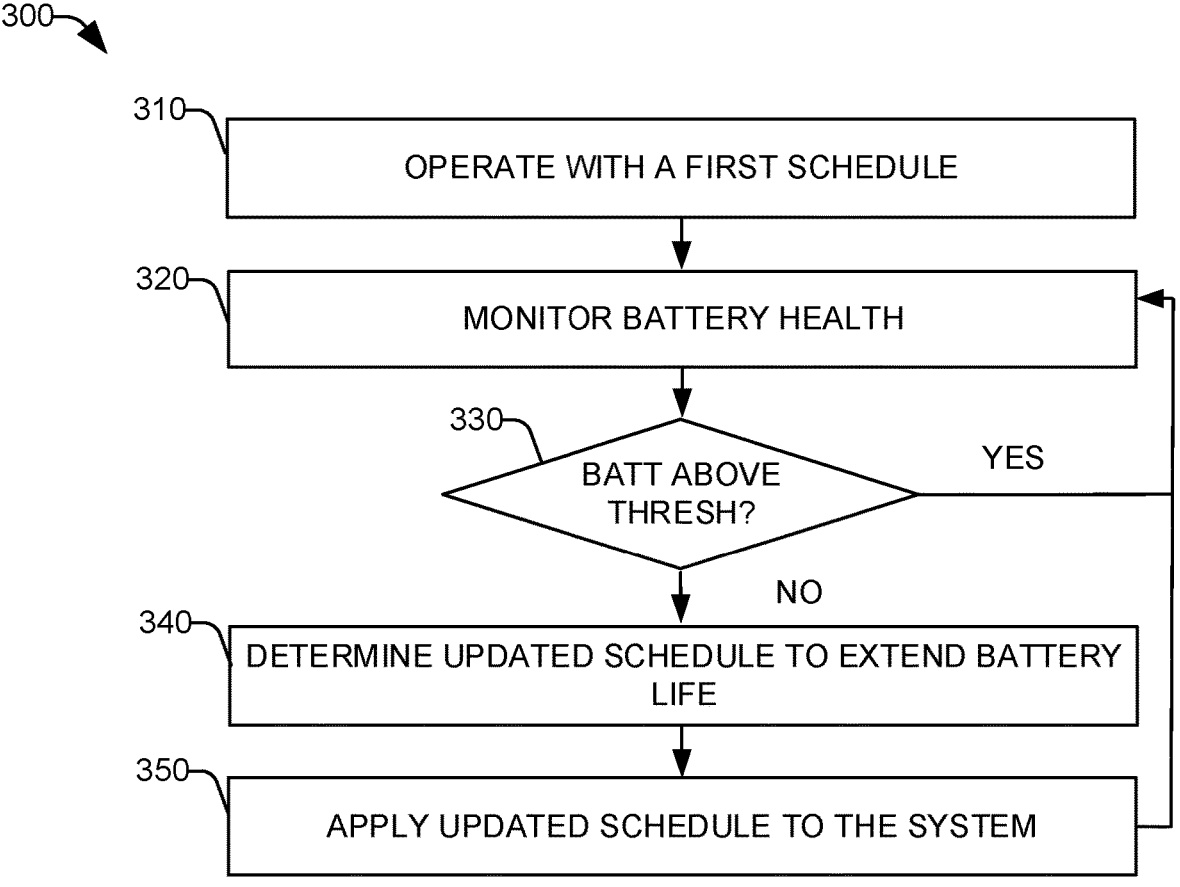
FIG. 3 illustrates a flow diagram for a computer-implemented methodology to synchronize transmission of data from a group of remote clients to a device, in accordance with at least one embodiment.

FIG. 3 illustrates a flow diagram 300 for a computer-implemented methodology to synchronize transmission of data from a group of remote clients to a device, in accordance with at least one embodiment.

At 310, as previously described, a synchronization component (e.g., synch comp. 115) can generate/establish a data cache schedule (e.g., time 124A) between at least two remote clients (e.g., remote clients 140A-n) and one or more local devices (e.g., a local device 170A). In an embodiment, a schedule can be established and transmitted as synchronization data (e.g., synchronization data 130A-n) to the at least two remote clients. Further, the schedule can be transmitted in schedule data (e.g., schedule data 135A-n) transmitted from the synchronization component to the local device. Accordingly, a first schedule for transmission of operational data (e.g., operational data 150A-n) can be established between the at least two remote clients and the one or more devices. As previously mentioned, the schedule can include a defined period of time at which transmission is to occur. For example, the schedule can define that the transmission/receipt of the operational data is to occur at 5 minutes past the hour. Accordingly, the local device (or sub-component, e.g., cache system 185A) can be configured to wake up from a low power mode at 5 minutes past the hour, at which time the at least two remote clients transmit the operational data to the local device. Once the data has been received/cached at the local device, the local device can return to low power mode, e.g., to save battery life.

At 320, the data caching operation between the at least two remote clients and the local device can proceed, e.g., according to the schedule defined in the synchronization data/schedule data. During operation of the local device, whether it be in low power mode or in wake up mode to receive the operational data, a background operation measuring the status of the battery (e.g., battery 172A) located on the local device can be performed. In an embodiment, a battery sensor (e.g., battery sensor 174A) operating on the local device can be configured to monitor operation of the battery (e.g., with regard to remaining power/charge, operational health, etc.). In an embodiment, the operational health of the battery can be assessed, e.g., by the battery sensor, with regard to whether the operational health of the battery is above or below a threshold value (e.g., threshold 173). The threshold value can be configured such that in the event of, for example, the remaining battery power is below the threshold value, the synchronization component can change the data caching schedule to extend the operational lifetime of the battery compared with continuing to operate with a schedule (e.g., a current schedule established at step 310).

At 330, a determination can be made regarding whether the operational health of the battery is above or below the threshold. The determination can be made by any suitable device, e.g., the battery sensor, the synchronization component, etc. In response to the operational condition of the battery is above the threshold (e.g., the battery currently has sufficient charge for there to be no concern regarding the battery dying as a function of the data caching operation, or other operation performed at the local device), methodology 300 can return to step 320, whereupon the health of the battery can be subsequently monitored to determine whether the data caching schedule should be adjusted.

At 330, in the event that the battery is not above the threshold, e.g., remaining power at the battery may be of concern, methodology 300 can advance to 340 where the caching schedule can be updated with a view to extend the battery life. For example, the synchronization component can be configured to extend the time between which the operational data is to be transmitted by the remote clients and the local device wakes up to receive the operational data. E.g., the synchronization component (e.g., in conjunction with battery component 116 and threshold 173) can be configured to extend the duration in the schedule between the respective times when the local device is to wake up to receive the operational data. For example, a prior schedule (e.g., a first schedule 124A) may have the data caching schedule set such that the local device wakes every hour to receive the operational data. To conserve the remaining battery power, the synchronization component can generate a new data caching schedule (e.g., a second schedule 124B) such that the local device is to wake every two hours and the remote clients are configured to transmit the operational data in accordance with the new data caching schedule. Methodology 300 can advance to 350, whereupon the synchronization component can transmit the new data caching schedule to the remote clients and the local device, for the remote clients and the local device to respectively apply the new data caching schedule. Methodology 300 can return to step 320 for further monitoring of the battery health and adjustment of the caching schedule, as required.

Figure 4:
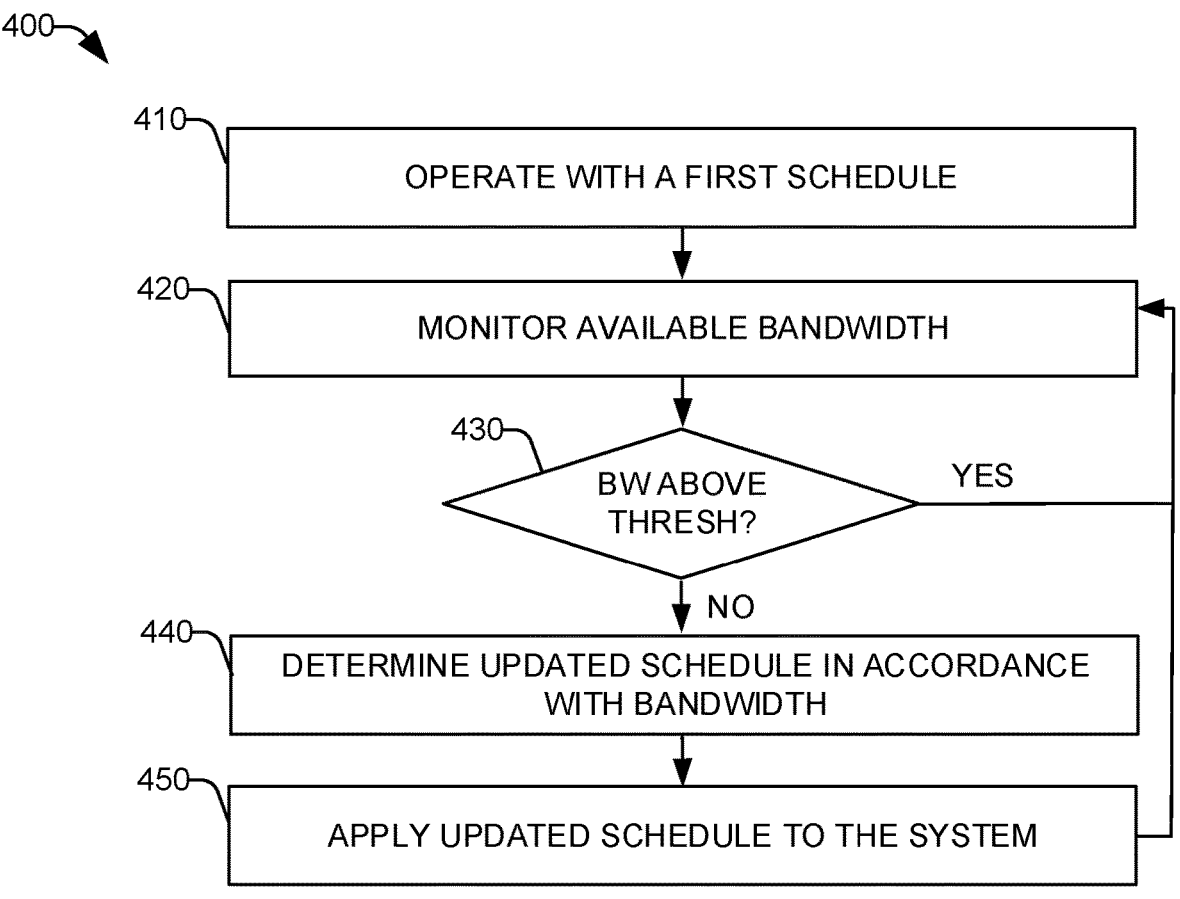
FIG. 4 illustrates a flow diagram for a computer-implemented methodology to synchronize transmission of data from a group of remote clients to a device, in accordance with at least one embodiment.

FIG. 4 illustrates a flow diagram 400 for a computer-implemented methodology to synchronize transmission of data from a group of remote clients to a device, in accordance with at least one embodiment.

At 410, as previously described, a synchronization component (e.g., synch comp. 115) can generate/establish a data cache schedule between at least two remote clients (e.g., remote clients 140A-n) and one or more local devices (e.g., local device 170A). In an embodiment, a schedule (e.g., time 124A) can be established and transmitted as synchronization data (e.g., synchronization data 130A-n) to the at least two remote clients. Further, the schedule can be transmitted in schedule data (e.g., schedule data 135A-n) transmitted from the synchronization component to the local device. Accordingly, a first schedule for transmission of operational data (e.g., operational data 150A-n) can be established between the at least two remote clients and the one or more devices. As previously mentioned, the schedule can include a defined period of time at which transmission is to occur. For example, the schedule can define that the transmission/receipt of the operational data is to occur at 5 minutes past the hour. Accordingly, the local device can be configured to wake up from a low power mode at 5 minutes past the hour, at which time the at least two remote clients transmit the operational data to the local device. Once the data has been received/cached at the local device, the local device can return to low power mode, e.g., to save battery life.

At 420, the data caching operation between the at least two remote clients and the local device can proceed, e.g., according to the schedule defined in the synchronization data/schedule data. During operation of the local device, whether it be in low power mode or in wake up mode to receive the operational data, a background operation can be performed, measuring the available bandwidth of the communications between at least one of the remote clients and the local device. For various reasons, bandwidth availability may be limited/scarce during a current period or a future period of the day. In an embodiment, a bandwidth component (e.g., bandwidth component 117) operating at the synchronization component (e.g., synch comp 115), as well as locally (e.g., a bandwidth component can be located at the local device to monitor receipt of the operational data to ensure that the operational data is being received in a timely manner, and further, the local device does not have to remain powered up to receive the data for an overly long period of time, which can lead to reduced battery life). In an embodiment, the bandwidth can be assessed, e.g., by the bandwidth component, with regard to whether the bandwidth is above or below a threshold value (e.g., bandwidth threshold 118). The threshold value can be configured such that in the event of, for example, the bandwidth is below the threshold value, the synchronization component can change the data caching schedule to extend the operational lifetime of the battery compared with continuing to operate with a schedule (e.g., a current schedule established at step 410).

At 430, a determination can be made regarding whether the bandwidth for communications between the remote clients and the local device is above or below the threshold. The determination can be made by any suitable device, e.g., the bandwidth component, the synchronization component, etc. In response to a determination that the bandwidth is above the threshold (e.g., operational data is being transmitted between the remote clients and the local device in a timely manner), methodology 400 can return to step 420, whereupon the available bandwidth can be subsequently monitored to determine whether the data caching schedule should be adjusted.

At 430, in the event that the bandwidth is determined to not be above the threshold, e.g., operational data is taking too long to be received at the local device, methodology 400 can advance to 440 where the caching schedule can be updated with a view to accommodate the insufficient bandwidth issue. For example, the synchronization component can be configured to extend the time between which the operational data is to be transmitted by the remote clients and the local device wakes up to receive the operational data. E.g., the synchronization component can be configured to extend the duration in the schedule between the respective times when the local device is to wake up to receive the operational data. For example, a prior schedule (e.g., a first schedule 124A) may have the data caching schedule set such that the local device wakes every hour to receive the operational data. To adjust for the reduced bandwidth availability, the synchronization component can generate a new data caching schedule (e.g., a second schedule 124B) such that the local device is to wake at a time when the bandwidth is sufficient to download the operational data. For example, the data caching schedule can be configured to be performed during a high bandwidth availability period, such as during the evening, and suchlike. Methodology 400 can advance to 450, whereupon the synchronization component can transmit the new data caching schedule to the remote clients and the local device, for the remote clients and the local device to respectively apply the new data caching schedule. Methodology 400 can return to step 420 for further monitoring of the available bandwidth and adjustment of the caching schedule, as required.

FIG. 5, schematic 500, presents a sequence diagram illustrating a series of operations where data transmission is unsynchronized, in accordance with an embodiment. As shown, at time 510, the remote client 140A is configured to transmit operational data 150A to the local device 170A. Owing to there being no synchronization of timing of data transmission 510 by the remote client 140A and data receipt/caching at the local device 170A, the local device 170A remains in a powered mode 520 for a significant duration of time (e.g., compared to FIG. 7), whereby energy from a battery (e.g., battery 172A) onboard local device 170A is being utilized in readiness to capture the operational data 150A being transmitted from the remote client 140A. As further shown, at 530, the remote client 140B can be configured to transmit operational data 150B to the local device 170A. Again, owing to there being no synchronization of timing of data transmission 530 by the remote client 140B and data receipt/caching at the local device 170A, the local device 170A remains in a powered mode 540 for a significant duration of time (e.g., compared to FIG. 6), whereby energy from a battery (e.g., battery 172A) onboard local device 170A is being utilized in readiness to capture the operational data 150B being transmitted from the remote client 140B. Hence, when operational data 150A-n is to be received at a local device 170A from two or more remote clients 140A-n, the local device 170A can remain in a powered-up state for an extended period of time, resulting in draining of battery 172A.

FIG. 6, schematic 600, presents a sequence diagram illustrating a series of operations where data transmission is synchronized, in accordance with an embodiment. As previously described, the synchronization component 115 can be configured to synchronize data transmission and receipt between remote clients 140A and 140B with local device 170A. At 610, the synch comp. 115 can be configured to detect the presence of the local device 170A and further assign the local device 170A with a unique identifier 122A that can be further shared with the remote client 140A and the remote client 140B.

At 612, 614, and 616, the synch comp 115 can transmit a cache data time 124A to each of the remote clients 140A-B and local device 170A. Accordingly, at 620, remote client 140A transmits operational data 150A to the local device 170A. As shown, at 630A, the local device 170A can be operating in a low power mode. However, at 635A, the local device 170A can wake up in readiness to receive the operational data 150A. As further shown, at 622, remote client 140B transmits operational data 150B to the local device 170A. Owing to the synchronized transmission of operational data 150A and 150B respectively by remote clients 140A and 140B, local device 170A is still in a powered mode 635A, however, given the receipt of operational data 150A and 150B, the local device 170A can return to a low power mode 630B.

As shown in FIG. 6, as the timing sequence 124A for caching respective instances of operational data 150A-B progresses (e.g., as previously described), the local device 170A can momentarily/temporarily transition from low power mode (e.g., during timings 630A-n) and a operational mode (e.g., during timings 635A-n). However, contrary to the unsynchronized operations presented in FIG. 6, the durations 635A-n for which the local device 170A has to be powered up to receive the operational data 150A-B are significantly shorter (as a function of the synchronized timings 124A-n) than the durations 635A-n that the local device 170A can be in a low lower mode 630A-n. Accordingly, it is readily apparent that comparing the respective operations presented in FIGS. 5 and 6, the local device 170A can remain in a low power mode 730A-n for longer periods of time than required for unsynchronized operation (as represented in FIG. 5), with the associated benefit of extended battery life of battery 172A.

As used herein, the terms "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Any of the battery component 116, the bandwidth component 117, the battery sensors 174A-n, etc., can include computer-based machine learning, artificial intelligence, and reasoning techniques and technologies that employ probabilistic and/or statistical-based analysis to prognose or infer an action that a user desires to be automatically performed. The various embodiments presented herein can utilize various machine learning-based schemes for carrying out various aspects thereof. For example, a process for determining whether a battery 172A-n is below threshold 173, whether sufficient bandwidth is available for signals 195A-n, transmission of synch data 130A-n, schedule data 135A-n, operational data 150A-n, etc., can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed (e.g., identification of low charge of battery 172A).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing one or more battery charge measurements of battery 172A by battery sensor 174A-n, bandwidth measurements, and suchlike). For example, SVM's are configured via a learning or training phase within a classifier constructor and feature selection module. Thus, the classifier(s) can be used to automatically learn and perform a number of functions, including but not limited to determining according to predetermined criteria, a low charge of battery 172A, for example.

As described supra, inferences can be made, and operations performed, based on numerous pieces of information. For example, operational health measurements of battery 172A by battery sensor 174A are compiled with information/data regarding power required to receive operational data 150A-n at a local device 170A (e.g., in memory 184A, cache 185A, etc.) regarding operating conditions of battery 172A, the respective information can be analyzed to determine converging patterns such that inferences can be made regarding the operational condition of battery 172A and requirement to extend the data caching operation.

Example Operating Environment and Scenarios

Figure 7:
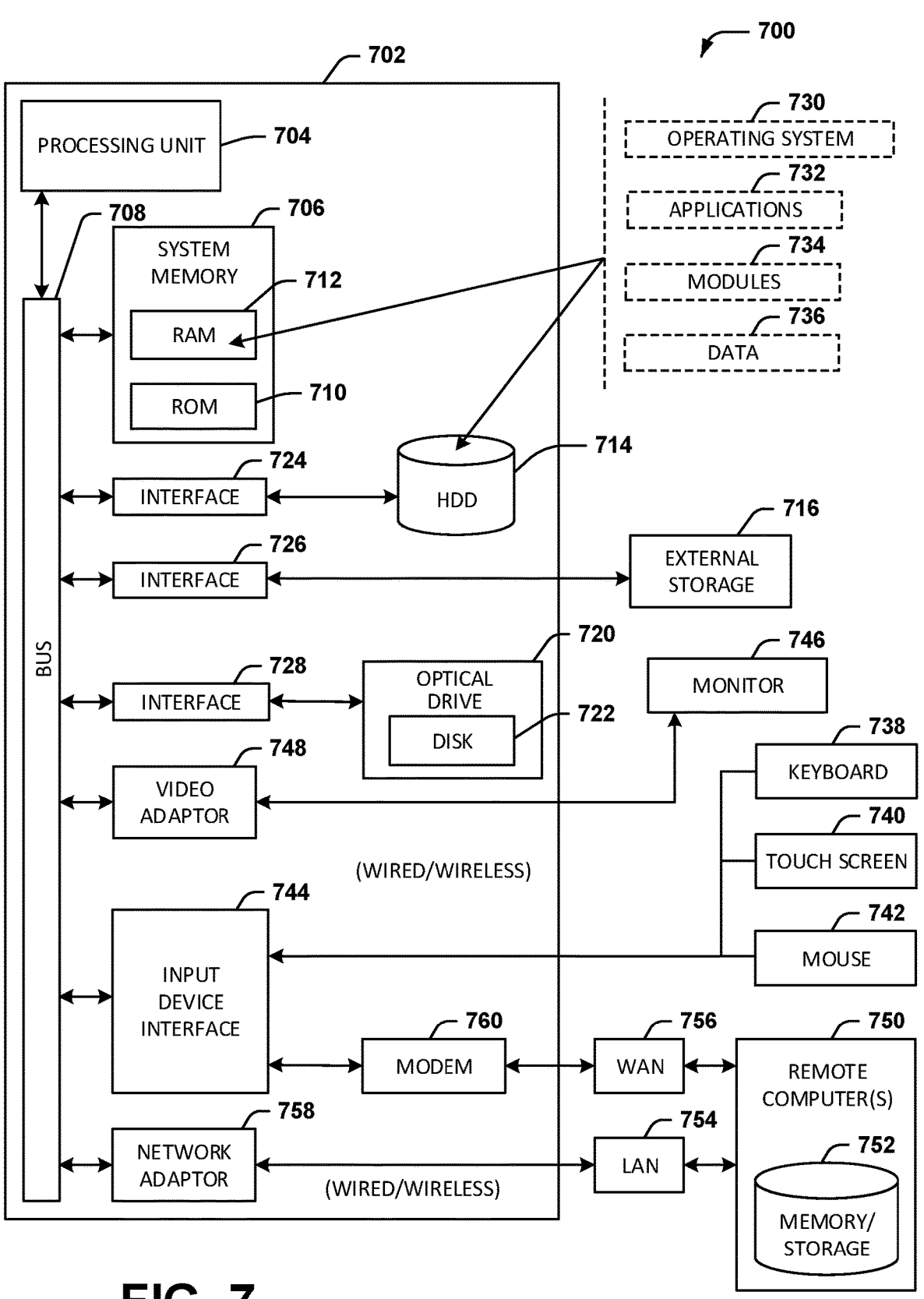
FIG. 7 is a block diagram illustrating an example computing environment with which the disclosed subject matter can interact, in accordance with an embodiment.
Figure 8:
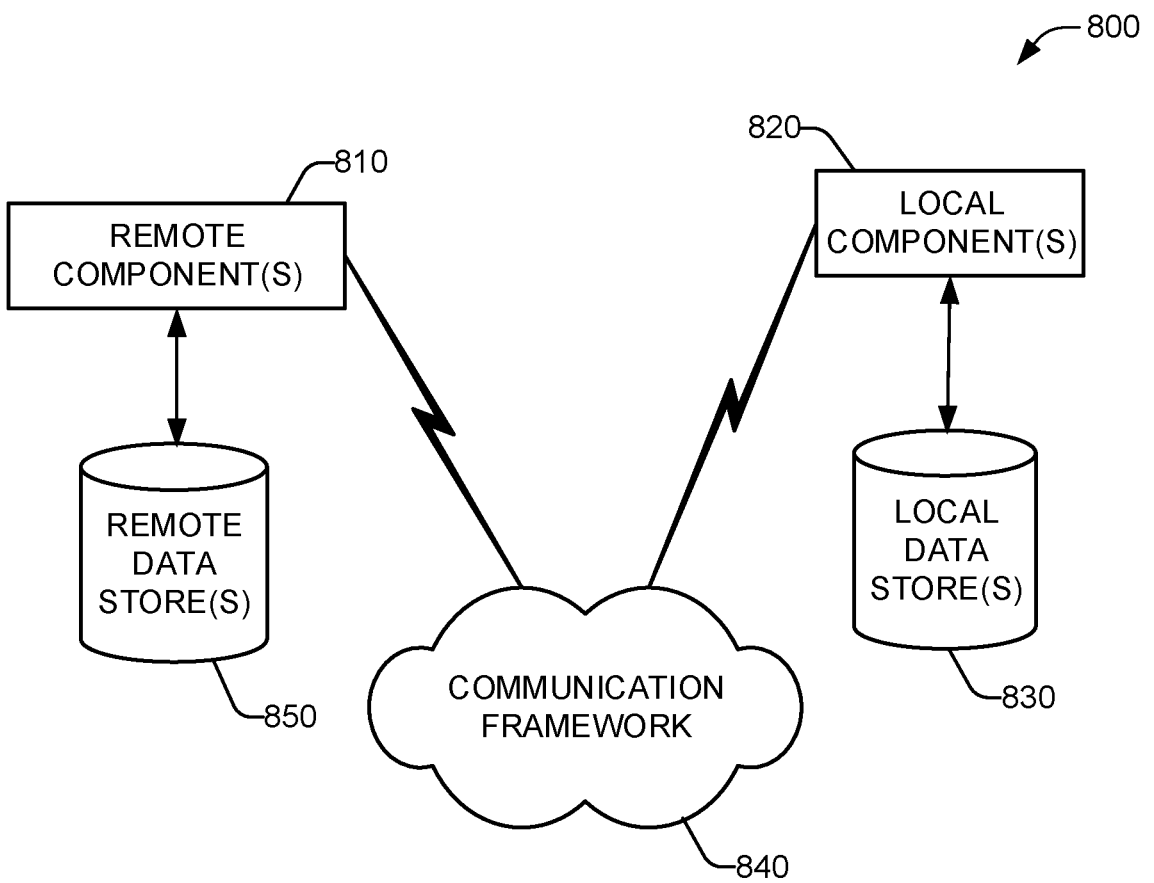
FIG. 8 is a block diagram illustrating an example computing environment with which the disclosed subject matter can interact, in accordance with an embodiment.

Turning next to FIGS. 7 and 8, a detailed description is provided of additional context for the one or more embodiments described herein with FIGS. 1A-6.

In order to provide additional context for various embodiments described herein, FIG. 7 and the following discussion are intended to provide a brief, general description of a suitable computing environment 700 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infra-red and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors and may include a cache memory. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 712 can also include a high-speed RAM such as static RAM for caching data.

The computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 720 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 720 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can comprise a security module, such as a trusted processing module (TPM). For instance with a TPM, boot components hash next in time boot components, and wait for a match of results to secured values, before loading a next boot component. This process can take place at any layer in the code execution stack of computer 702, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infra-red (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1094 serial port, a game port, a USB port, an IR interface, a BLUETOOTH® interface, etc.

A monitor 746 or other type of display device can be also connected to the system bus 708 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 760 or can be connected to a communications server on the WAN 756 via other means for establishing communications over the WAN 756, such as by way of the internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 8, an illustrative cloud computing environment 800 is depicted. FIG. 8 is a schematic block diagram of a computing environment 800 with which the disclosed subject matter can interact. The system 800 comprises one or more remote component(s) 810. The remote component(s) 810 can be hardware and/or software (e.g., threads, processes, computing devices). In some embodiments, remote component(s) 810 can be a distributed computer system, connected to a local automatic scaling component and/or programs that use the resources of a distributed computer system, via communication framework 840. Communication framework 840 can comprise wired network devices, wireless network devices, mobile devices, wearable devices, radio access network devices, gateway devices, femtocell devices, servers, etc.

The system 800 also comprises one or more local component(s) 820. The local component(s) 820 can be hardware and/or software (e.g., threads, processes, computing devices). In some embodiments, local component(s) 820 can comprise an automatic scaling component and/or programs that communicate/use the remote resources 810 and 820, etc., connected to a remotely located distributed computing system via communication framework 840.

One possible communication between a remote component(s) 810 and a local component(s) 820 can be in the form of a data packet adapted to be transmitted between two or more computer processes. Another possible communication between a remote component(s) 810 and a local component(s) 820 can be in the form of circuit-switched data adapted to be transmitted between two or more computer processes in radio time slots. The system 800 comprises a communication framework 840 that can be employed to facilitate communications between the remote component(s) 810 and the local component(s) 820, and can comprise an air interface, e.g., Uu interface of a UMTS network, via a long-term evolution (LTE) network, etc. Remote component(s) 810 can be operably connected to one or more remote data store(s) 850, such as a hard drive, solid state drive, SIM card, device memory, etc., that can be employed to store information on the remote component(s) 810 side of communication framework 840. Similarly, local component(s) 820 can be operably connected to one or more local data store(s) 830, that can be employed to store information on the local component(s) 820 side of communication framework 840.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity," "consumer," "client entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Various non-limiting aspects of various embodiments described herein are presented in the following clauses.

Clause 1: A system, comprising: a memory that stores computer executable components; and a processor that executes the computer executable components stored in the memory, wherein the computer executable components comprise: a synchronization component configured to control transfer of data between at least two remote clients and a first local device, wherein the synchronization component is configured to generate a first data synchronization schedule, the first data synchronization schedule is configured with a defined frequency of wakeup operations undertaken by the first local device to receive data from the at least two remote clients.

Clause 2: The system of any preceding clause, wherein the first data synchronization schedule comprises a first time at which: a first remote client in the at least two remote clients transfers first data to the first local device; a second remote client in the at least two remote clients transfers second data to the first local device; and the first local device temporarily transitions between a low power mode of operation to a data receive mode of operation to facilitate receipt of the first data and the second data, wherein the duration of temporary low power mode of operation is sufficient to enable receipt of the first data and the second data.

Clause 3: The system of any preceding clause, wherein the synchronization component is further configured to determine a second data synchronization schedule, wherein the second data synchronization schedule comprises a second time at which: a second local device communicatively coupled to the synchronization component transitions from a low power mode of operation to a data receive mode of operation to facilitate receipt of data; the first remote client transfers third data to the second local device; and the second remote client transfers fourth data to the second local device, wherein the second data synchronization schedule is disparate to the first data synchronization schedule.

Clause 4: The system of any preceding clause, further comprising a look-up table, wherein the synchronization component is further configured to assign a first unique identifier to the first local device and populate the look-up table with the first unique identifier and the first data synchronization schedule.

Clause 5: The system of any preceding clause, wherein the synchronization component is further configured to assign a second unique identifier to the second local device, and populate the look-up table with the second unique identifier and the second data synchronization schedule.

Clause 6: The system of any preceding clause, wherein the first local device is powered by a battery.

Clause 7: The system of any preceding clause, wherein the first local device is one of a cellphone, user equipment, a wearable communication device, an extended reality device, an Internet of Things device, or an automated assistant device.

Clause 8: The system of any preceding clause, wherein the first local device is located onboard a vehicle.

Clause 9: The system of any preceding clause, wherein the vehicle is operating at least semi-autonomously.

Clause 10: The system of any preceding clause, wherein the first data or the second data comprises operational data configured to control at least one operation of the first local device.

Clause 11: A computer-implemented method comprising: generating, by a device comprising a processor, a first data synchronization schedule, the first data synchronization schedule is configured to minimize frequency of wakeup operations undertaken by a first local device to receive data transmitted from at least two remote clients.

Clause 12: The method of any preceding clause, wherein the first data synchronization schedule comprises a first time at which: a first remote client in the at least two remote clients transfers first data to the first local device; a second remote client in the at least two remote clients transfers second data to the first local device; and the first local device temporarily transitions between a low power mode of operation to a data receive mode of operation to facilitate receipt of the first data and the second data, wherein the duration of temporary low power mode of operation is sufficient to enable receipt of the first data and the second data.

Clause 13: The method of any preceding clause, further comprising: determining, by the device, a second data synchronization schedule, wherein the second data synchronization schedule comprises a second time at which: a second local device temporarily transitions between a low power mode of operation to a data receive mode of operation to facilitate receipt of data; the first remote client transfers third data to the second local device; and the second remote client transfers fourth data to the second local device, wherein the second data synchronization schedule is disparate to the first data synchronization schedule.

Clause 14: The method of any preceding clause, further comprising: assigning a first unique identifier to the first local device; assigning a second unique identifier to the second local device; and populating a look-up table with: the first unique identifier combined with the first data synchronization schedule; and the second unique identifier combined with the second data synchronization schedule.

Clause 15: The method of any preceding clause, wherein the first local device is powered by a battery.

Clause 16: A computer program product for determining failure of a battery pack located on a vehicle, the computer program product comprising a computer readable storage medium having program instructions embodied therewith, the program instructions executable by a processor to cause the processor to: generate a first data synchronization schedule, the first data synchronization schedule is configured with a defined frequency of wakeup operations undertaken by a first local device to receive data transmitted from at least two remote clients.

Clause 17: The computer program product of any preceding clause, wherein the wherein the first data synchronization schedule comprises a first time at which: a first remote client in the at least two remote clients transfers first data to the first local device; a second remote client in the at least two remote clients transfers second data to the first local device; and the first local device temporarily transitions between a low power mode of operation to a data receive mode of operation to facilitate receipt of the first data and the second data, wherein the duration of temporary low power mode of operation is sufficient to enable receipt of the first data and the second data.

Clause 18: The computer program product of any preceding clause, wherein the program instructions are further executable by the processor to cause the processor to: determine a second data synchronization schedule, wherein the second data synchronization schedule comprises a second time at which: a second local device temporarily transitions between a low power mode of operation to a data receive mode of operation to facilitate receipt of data; the first remote client transfers third data to the second local device; and the second remote client transfers fourth data to the second local device, wherein the second data synchronization schedule is disparate to the first data synchronization schedule.

Clause 19: The computer program product of any preceding clause, wherein the program instructions are further executable by the processor to cause the processor to: assign a first unique identifier to the first local device; assign a second unique identifier to the second local device; and populate a look-up table with: the first unique identifier combined with the first data synchronization schedule; and the second unique identifier combined with the second data synchronization schedule.

Clause 20: The computer program product of any preceding clause, wherein the first local device is powered by a battery.

In various cases, any suitable combination of clauses 1-10 can be implemented.

In various cases, any suitable combination of clauses 11-15 can be implemented.

In various cases, any suitable combination of clauses 16-20 can be implemented.

What is claimed is:

1. A system, comprising:
    a memory that stores computer executable components; and
    a processor that executes at least one of the computer executable components that:
        controls transfers of data between at least two remote clients and a group of local devices comprising a first local device in a low power mode, wherein the controlling the transfers comprises:
            generating a first data synchronization schedule for the transfers that minimizes wakeup operations of the first local device, wherein the wakeup operations respectively take the first local device out of the low power mode, wherein the first data synchronization schedule is configured with a defined frequency of wakeup operations undertaken by the first local device to receive at least a portion of the data from the at least two remote clients, and wherein the first data synchronization schedule is configured to prevent any wakeup operation overlaps between the defined frequency of wakeup operations undertaken by the first local device and respective defined frequencies of wakeup operations undertaken by other local devices of the group of local devices, and
            controlling the transfers based on the first data synchronization schedule.

2. The system of claim 1, wherein the first data synchronization schedule comprises a first time at which:
    a first remote client of the at least two remote clients transfers first data to the first local device;
    a second remote client of the at least two remote clients transfers second data to the first local device; and
    the first local device temporarily transitions between the low power mode of operation to a data receive mode of operation to facilitate receipt of the first data and the second data, wherein a duration of the low power mode of operation is sufficient to enable receipt of the first data and the second data.

3. The system of claim 2, wherein the at least one of the computer executable components further:

determines a second data synchronization schedule associated with a second local device of the group of local devices, wherein the second data synchronization schedule comprises a second time at which:

the second local device communicatively transitions from the low power mode of operation to a data receive mode of operation to facilitate receipt of data;

the first remote client transfers third data to the second local device; and the second remote client transfers fourth data to the second local device, wherein the second data synchronization schedule is disparate to the first data synchronization schedule.

4. The system of claim 3, further comprising a look-up table, and wherein the at least one of the computer executable components further:

assigns a first unique identifier to the first local device, and populates the look-up table with the first unique identifier and the first data synchronization schedule.

5. The system of claim 4, wherein the at least one of the computer executable components further:

assigns a second unique identifier to the second local device, and populates the look-up table with the second unique identifier and the second data synchronization schedule.

6. The system of claim 2, wherein the first local device is powered by a battery.

7. The system of claim 2, wherein the first local device is one of a cellphone, user equipment, a wearable communication device, an extended reality device, an Internet of Things device, or an automated assistant device.

8. The system of claim 2, wherein the first local device is located onboard a vehicle.

9. The system of claim 8, wherein the vehicle is operating at least semi-autonomously.

10. The system of claim 2, wherein the first data or the second data comprises operational data configured to control at least one operation of the first local device.

11. A computer-implemented method comprising:

controlling, by a system comprising a processor, transfers of data between at least two remote clients and a group of local devices comprising a first local device in a low power mode, wherein the controlling the transfers comprises:

generating a first data synchronization schedule for the transfers that minimizes wakeup operations of the first local device, wherein the wakeup operations respectively take the first local device out of the low power mode, wherein the first data synchronization schedule is configured with a defined frequency of wakeup operations undertaken by the first local device to receive at least a portion of the data from the at least two remote clients, and wherein the first data synchronization schedule is configured to prevent any wakeup operation overlaps between the defined frequency of wakeup operations undertaken by the first local device and respective defined frequencies of wakeup operations undertaken by other local devices of the group of local devices, and controlling the transfers based on the first data synchronization schedule.

12. The computer-implemented method of claim 11, wherein the first data synchronization schedule comprises a first time at which:

a first remote client of the at least two remote clients transfers first data to the first local device;

a second remote client of the at least two remote clients transfers second data to the first local device; and the first local device temporarily transitions between the low power mode of operation to a data receive mode of operation to facilitate receipt of the first data and the second data, wherein a duration of the low power mode of operation is sufficient to enable receipt of the first data and the second data.

13. The computer-implemented method of claim 12, further comprising:

determining, by the system, a second data synchronization schedule associated with a second local device of the group of local devices, wherein the second data synchronization schedule comprises a second time at which:

the second local device temporarily transitions between the low power mode of operation to a data receive mode of operation to facilitate receipt of data;

the first remote client transfers third data to the second local device; and the second remote client transfers fourth data to the second local device, wherein the second data synchronization schedule is disparate to the first data synchronization schedule.

14. The computer-implemented method of claim 13, further comprising:

assigning, by the system, a first unique identifier to the first local device;

assigning, by the system, a second unique identifier to the second local device; and populating, by the system, a look-up table with:

the first unique identifier combined with the first data synchronization schedule; and the second unique identifier combined with the second data synchronization schedule.

15. The computer-implemented method of claim 12, wherein the first local device is powered by a battery.

16. A computer program product comprising a non-transitory computer readable medium having program instructions embodied therewith, wherein the program instructions are executable by a processor to cause the processor to:

control transfers of data between at least two remote clients and a group of local devices comprising a first local device in a low power mode, wherein the controlling the transfers comprises:

generating a first data synchronization schedule for the transfers that minimizes wakeup operations of the first local device, wherein the wakeup operations respectively take the first local device out of the low power mode, wherein the first data synchronization schedule is configured with a defined frequency of wakeup operations undertaken by the first local device to receive at least a portion of the data from the at least two remote clients, and wherein the first data synchronization schedule is configured to prevent any wakeup operation overlaps between the defined frequency of wakeup operations undertaken by the first local device and respective defined frequencies of wakeup operations undertaken by other local devices of the group of local devices, and controlling the transfers based on the first data synchronization schedule.

17. The computer program product of claim 16, wherein the first data synchronization schedule comprises a first time at which:

a first remote client of the at least two remote clients transfers first data to the first local device;

a second remote client of the at least two remote clients transfers second data to the first local device; and the first local device temporarily transitions between the low power mode of operation to a data receive mode of operation to facilitate receipt of the first data and the second data, wherein a duration of the low power mode of operation is sufficient to enable receipt of the first data and the second data.

18. The computer program product of claim 17, wherein the program instructions are further executable by the processor to cause the processor to:

determine a second data synchronization schedule associated with a second local device of the group of local devices, wherein the second data synchronization schedule comprises a second time at which:

the second local device temporarily transitions between the low power mode of operation to a data receive mode of operation to facilitate receipt of data;

the first remote client transfers third data to the second local device; and the second remote client transfers fourth data to the second local device, wherein the second data synchronization schedule is disparate to the first data synchronization schedule.

19. The computer program product of claim 18, wherein the program instructions are further executable by the processor to cause the processor to:

assign a first unique identifier to the first local device;

assign a second unique identifier to the second local device; and populate a look-up table with:

the first unique identifier combined with the first data synchronization schedule; and the second unique identifier combined with the second data synchronization schedule.

20. The computer program product of claim 19, wherein the first local device is powered by a battery.

\* \* \* \* \*